United States Patent [19]
Duffy

[11] 3,833,011
[45] Sept. 3, 1974

[54] RETRACTABLE AWNING ASSEMBLY
[75] Inventor: Donald D. Duffy, Seal Beach, Calif.
[73] Assignee: W & F Manufacturing, Inc., Glendale, Calif.
[22] Filed: Mar. 13, 1974
[21] Appl. No.: 450,769

Related U.S. Application Data
[63] Continuation-in-part of Ser. No. 275,206, July 26, 1972, abandoned.

[52] U.S. Cl. ............ 135/5 AT, 135/7.1 A, 160/22, 160/68
[51] Int. Cl. ............................................. E04f 10/06
[58] Field of Search ......... 135/5 R, 5 A, 5 AT, 4 A, 135/7.1 A; 160/22, 23, 45, 64, 70, 66, 68, 72, 73, 79, 265, 392

[56] References Cited
UNITED STATES PATENTS
| | | | |
|---|---|---|---|
| 2,583,824 | 1/1952 | Dwinell et al. | 160/22 |
| 3,364,973 | 1/1968 | Railson | 160/22 |
| 3,722,571 | 3/1973 | Knight et al. | 160/23 |
| 3,730,196 | 5/1973 | Borskey | 160/22 |

Primary Examiner—J. Karl Bell
Attorney, Agent, or Firm—Fulwider, Patton, Rieber, Lee & Utecht

[57] ABSTRACT

A retractable awning assembly including an elongated housing mountable on a recreational supporting vehicle and carrying a spring-loaded elongated roller, an awning having an inner edge attached to the roller and an outer edge secured to an elongated lead bar, and means for bracing the awning in an extended position. The bracing structure includes main brace arms pivotally connected to the ends of the lead bar to extend between the lead bar and anchors on the vehicle, and stabilizer arms pivotally attached to the brace arms to extend between the brace arms and anchors on the housing. The brace arms are channels which receive the stabilizer arms for storage, and the lead bar also is a channel which receives the main brace arms for storage, with the stabilizer arms nested in them. In an alternative embodiment, the inner edge of the awning is attached to the receptacle, and the awning is retracted by rolling it upon the lead bar.

13 Claims, 10 Drawing Figures

PATENTED SEP 3 1974 3,833,011

RETRACTABLE AWNING ASSEMBLY

CROSS-REFERENCE TO RELATED APPLICATIONS

This application is a continuation-in-part of pending application Ser. No. 275,206 filed July 26, 1972, now abandoned.

BACKGROUND OF THE INVENTION

This invention relates to awnings, and more particularly, to retractable, self-storing awning assemblies for use on recreational vehicles and the like.

The enjoyment of recreational vehicles, such as campers and trailers, is enhanced by the addition of an awning or canopy which can be installed on an outside portion of the vehicle to provide additional sheltered space immediately adjacent the vehicle. Various awning structures have been suggested by the prior art for use on recreational vehicles, many requiring complete assembly prior to use and disassembly for storage in the vehicle.

A preferred general type of awning assembly, disclosed in U.S. Pat. No. 3,364,973, is mountable on the exterior of a vehicle for extension and retraction of the awning without need for complete disassembly. In general, such awning assemblies include an elongated housing mountable on the vehicle with an awning stored in a rolled condition in the housing and secured along an inner edge of the housing, usually by means of a spring-loaded take-up roller from which the awning can be withdrawn and unrolled to an extended position. Means are provided for holding the awning in the extended position, and releasing the awning for return to the storage position in the housing.

The retractable awning assembly in U.S. Pat. No. 3,364,973, which is of the same general type shown herein, has a bracing structure including an elongated bar along its outer edge for use in extending and retracting the awning as well as in holding the awning in the extended position. This bar, referred to as a "lead bar," is secured to the awning adjacent its outer edge, and is held in the extended position by at least one, and preferably two, main braces which extend from the lead bar to the vehicle. The outer ends of these braces are pivotally connected to the ends of the lead bars so that the braces can be swung to storage positions alongside the lead bar, and the inner ends of the braces are releasably attachable to anchors on the vehicle or the housing. When in place, the main braces stretch the awning between the housing and the lead bar and hold the awning extended. Additional separate braces have been provided to extend between the main braces and anchors on the housing, for extra stability.

When such an awning is to be retracted and stored in the housing, the main braces are released from the anchors and swung to positions beside the lead bar, so that the awning can be rolled back into the housing. The stabilizing braces, which were removed from the bracing structure prior to retracting the awning, have been stored in whatever space that may be available. The present invention provides an improved retractable awning assembly for recreational vehicles that is more conveniently extended and retracted, and is more compactly stored.

SUMMARY OF THE INVENTION

The present invention resides in a retractable awning assembly which is movable between an extended position and the retracted position without the necessity of disassembling or assembling separate braces. In the extended position, the awning strucutre is securely braced to provide a stable structure, and in its fully retracted position, the main braces, the stabilizing braces, and the lead bar are compactly nested together and stored within the awning housing on the vehicle.

More particularly, the retractable awning assembly of the present invention has a bracing structure in which each stabilizing brace is an arm that is pivotally connected at its outer end to the associated main brace, to swing from a storage position in nested relation with the main brace, to an active position in which the stabilizing arm is at an angle with the main brace, thus eliminating the need for assembly, disassembly, and separate storage of the stabilizing braces. In addition, the lead bar is recessed to receive the main braces (with the stabilizing braces nested therein) within the lead bar, for even more compact storage and convenient handling.

Other aspects and advantages of the invention will become apparent from the following detailed description, taken in conjunction with the accompanying drawings.

DETAILED DESCRIPTION OF THE PREFERRED EMBODIMENT

Figure 1:
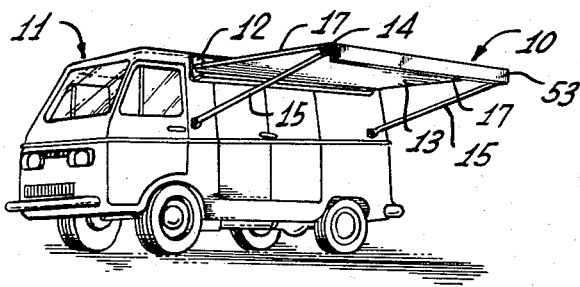
FIG. 1 is a perspective view showing a recreational vehicle equipped with an awning assembly in accordance with the present invention, the awning being shown in the extended position.

As shown in the drawings for purposes of illustration, the invention is embodied in a retractable awning assembly, indicated generally by the reference number 10, that is mounted on a representative recreational vehicle, specifically a van 11. In general, the awning assembly 10 comprises an elongated housing 12 forming a receptacle mountable on the side of the vehicle, a rectangular awning 13 of suitable flexible sheet material that is secured along one edge in the housing 12, an elongated lead bar 14 fastened to its edge remote from the housing, and two elongated main brace arms 15 for holding the awning extended. The brace arms 15 extend from anchors 16 on the side of the vehicle, below the housing 12, outwardly to the ends of the lead bar 14, and two additional brace arms 17 extend upwardly from the main brace arms 15 from points spaced inwardly from the lead bar, to additional anchors 16 on the housing to stabilize the brace arms.

In the embodiment shown in FIGS. 1 through 8, the inner edge of the awning 13 is secured to an elongated, spring-loaded roller 19 that is rotatably supported in the housing 12 with its ends journaled on plates 21 forming the ends of the housing. Thus, the awning may be extended and retracted in much the same manner as the operation of a window blind.

Figures 7, 8, 9, 10:
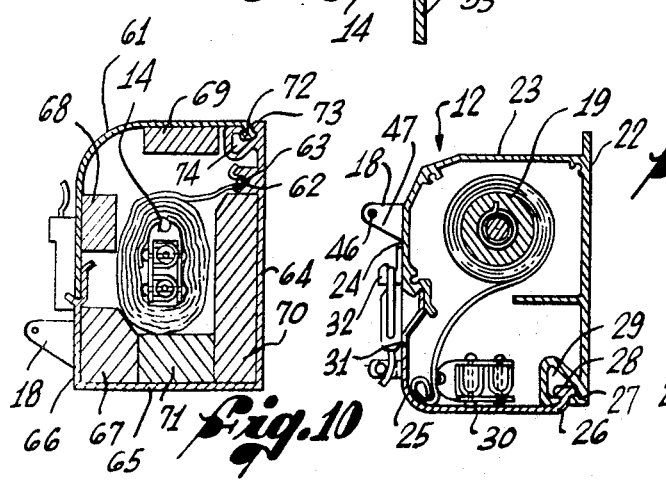
FIG. 7 is an enlarged cross-sectional view taken along line 7—7 of FIG. 6 and showing the main braces folded into the lead bar.
FIG. 8 is an enlarged cross-sectional view of the awning structure in the fully retracted position.
FIG. 9 is an enlarged view of a portion of FIG. 8.
FIG. 10 is a cross-sectional view similar to FIG. 8 and another embodiment of the awning assembly.

The body of the housing preferably in a channel-shaped extrusion, as shown most clearly in FIG. 8, comprising a back wall 22, a top wall 23, and a front or outer wall 24, the remainder of the housing being formed by an elongated cover 25 of L-shaped cross-section which also may be an extrusion. Along one edge of the cover is an upturned lip 26 that extends into a longitudinal slot 27 in the underside of the housing body and terminates in an enlarged bead 28 that is rotatably disposed in a longitudinal channel 29 above the slot. This bead is larger than the slot, and thus forms a hinge for mounting the cover 25 pivotally on the body, for swinging between the open position shown in FIG. 1 and the closed position shown in FIG. 8.

In the closed position, one wall 30 of the cover forms the bottom of the housing 12 and another 31 extends upwardly and overlaps snugly with the lower edge portion of the front wall 24. Means, such as a latch 32 (FIG. 8), hold the cover in the closed position. Two or more such latches may be spaced apart longitudinally of the housing, preferably with one on each side of the awning 13 when it is extended. When the latches are released, the cover swings down to the open position, to permit the lead bar to be pulled from the housing to extend the awning.

Each main brace 15 is an elongated arm of preselected length determined by the width of the awning 13, and is pivotally connected to one end of the lead bar 14 by means of a pivot pin 33, as shown in FIGS. 2, 6, 7, 8, to swing between a storage position alongside of the lead bar (FIGS. 7 and 8) and a bracing position perpendicular to the lead bar. Each of anchors 16 is simply a pin 34 (see FIGS. 2 and 4) that extends between two spaced fingers 35 on the side of the vehicle, the inner end portion of each brace arm having a notch 36 (FIG. 4) in its underside for fitting over the pin 34 between the fingers 35, and being reinforced by a plug 37 which fills the inner end of the brace.

In accordance with a primary aspect of the present invention, each stabilizer arm 17, which formerly was a separate piece, is pivotally secured to the main brace arm 15 to swing between a storage position in closely spaced, generally parallel relation with the main brace arm, and a stabilizing position at an angle with the brace arm, so as to be handled as a unit with the brace arm during the setting up and taking down of the awning. In addition, for more compact storage, the stabilizer arm and the main brace arm are shaped to interfit in nested relation in the storage condition.

Figure 2:
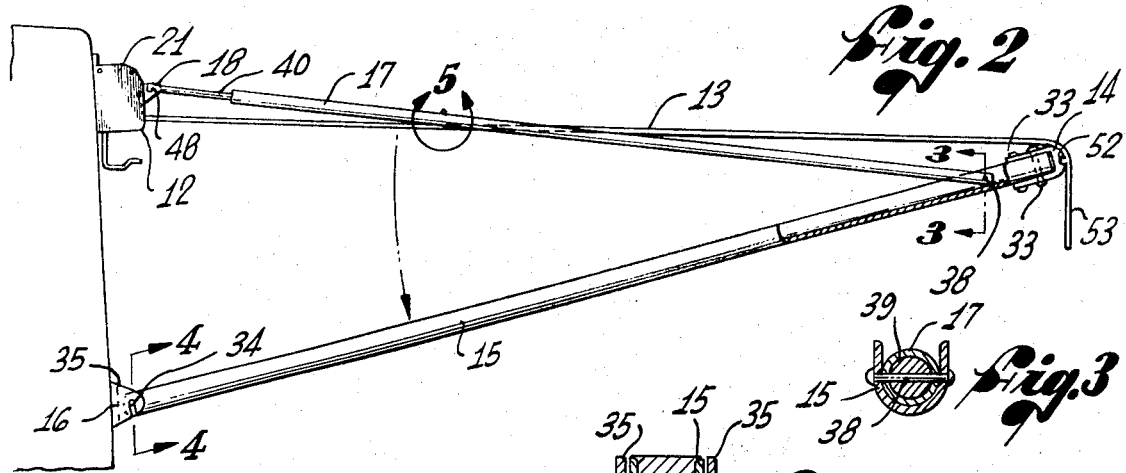
FIG. 2 is an enlarged fragmentary side elevation of part of FIG. 1, partially broken away and shown in cross-section.
Figure 3:
FIG. 3 is an enlarged cross-sectional view taken along line 3—3 of FIG. 2.
Figure 4:
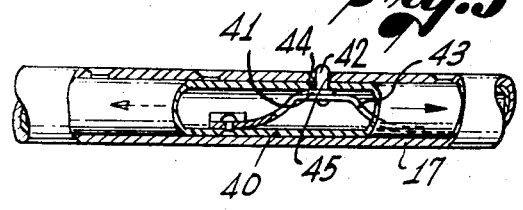
FIG. 4 is an enlarged cross-sectional view taken along line 4—4 of FIG. 2.
Figure 6:
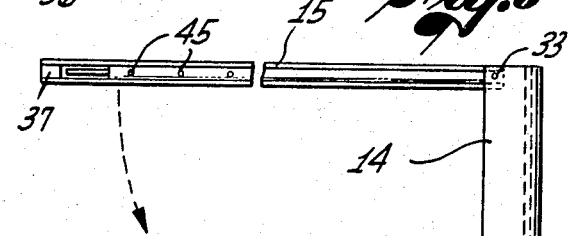
FIG. 6 is a plan view of the bracing structure, with portions broken away and with one of the main braces partially folded toward the lead bar.
Figure 5:
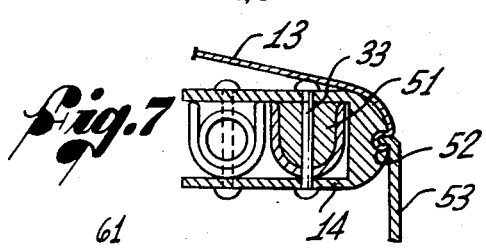
FIG. 5 is an enlarged fragmentary view, partially broken away and partially in side elevation, showing a section of the stabilizing brace within the arc 5 of FIG. 2.

As shown most clearly in FIGS. 2, 3, and 4, the main brace arm 15 is channel-shaped in cross-section and has an open upper side, and the stabilizer arm 17 is a tube that is sized to be received in the channel in the storage position (FIG. 3). The outer end of the stabilizer arm is located adjacent the outer end of the main brace arm, and a pivot pin 38, herein a rivet, extends through the sidewalls of the channel, through the stabilizer arm, and through a reinforcing plug 39 therein.

To permit longitudinal extension and contraction of the stabilizer arms 17, each has a tubular extension 40 that is slidably telescoped in the inner end portion of the main tubular section of the arm, and a spring-loaded detent 41 (FIG. 5) is mounted in the extension tube to latch the latter in different positions relative to the main tubular section. Herein, this detent is a button 42 that is carried on a leaf spring 43 that is riveted in place inside the extension tube, and extends through an aperture 44 therein and into one of a series of similar apertures 45 (see FIGS. 5 and 6) in the main tubular section. The button can be depressed into the tubular section, so that the extension tube can be slid to different positions in which the button is aligned with one of the apertures 45.

With this arrangement, the stabilizer arms 17 can be shortened to a length less than the main brace arms, for storage, and then extended to different selected lengths for engagement with the anchors 18. The latter are similar to the anchors 16, and include pins 46 supported on spaced fingers 47 which, in this case, project outwardly from the front wall 24 of the housing. The inner end portion of each extension tube 40 has a notch 48 in its underside for fitting over the pin 46 of the associated anchor, between the fingers thereof.

Another important feature of the invention is the improved manner in which the main brace arms 15 are folded into side-by-side relation with the lead bar 14 for more compact storage in the housing 12 and increased convenience of handling during extension and retraction of the awning 13. Instead of being disposed beside, and somewhat spaced from, the lead bar, as in the aforesaid patent, the main brace arms are received in recesses in the lead bar, in nested relation therewith.

More specifically, the lead bar 14 herein is formed as an elongated channel of U-shaped cross-section, and the outer ends of the main brace arms 15 are received in the opposite ends of the channel and pivotally joined thereto by the pins 33, which extend through the sidewalls of the channel and through the outer end portions of the main brace arms. Reinforcing plugs 51, similar to the plugs 37, preferably are disposed in these outer end portions for increased strength and durability. It will be noted that the pivotal axes defined by the pins 33 are perpendicular to the axes defined by the pins 38 forming the pivots for the stabilizer arms 17.

The channel defined by the lead bar preferably is deep enough to receive both main brace arms 15 in longitudinally overlapping relation, as shown in FIG. 7, and the two pivot pins 33 are laterally offset from each other so that the main brace arms will be received in parallel, side-by-side relation. To connect the lead bar to the outer edge portion of the awning 13, a longitudinal groove 52 is formed in the outer side of the lead bar, and the awning is nipped in this groove. A narrow fringe or valance 53 preferably is secured to the lead bar to hang down therefrom, as shown in FIG. 1, and may be either a separate piece or an extension of the awning beyond the lead bar.

When the retractable awning assembly 10 has been installed on a vehicle 11, in the position shown in FIG.

1, it is carried in the compact and out-of-the-way stored position shown in FIG. 8. To prepare for extension of the awning 13, the operator simply unlatches and opens the cover 25, grasps the lead bar 14 with the brace arms 15 and 17 therein, and draws the awning out of the housing. Then he swings the main brace arms 15 out of the lead bar and sets them in the anchors 16, preferably with the assistance of another person.

When this has been done, the awning 13 can be adjusted to the desired angle, and latched at the housing. The preferred way to latch the awning is to close and latch the cover 25, with the awning extending out between the overlapped portions of the front wall 24 and the cover, and pinched between the two. The stabilizer arms 17 are swung up to their anchors 18 and adjusted in length as necessary to make the awning taut.

The steps used in returning the awning 13 to the retracted position are simply the reverse of those for extending the awning. The stabilizer arms 17 are released from their anchors 18 and returned to nested positions in the main brace arms 15, the housing 12 is opened to release the awning, and the main brace arms 15 are swung into their folded positions in the lead bar 14. Then the valance 53 should be rolled onto the lead bar, and the latter is moved back to the housing to let the awning be rolled up on the roller 19. When the lead bar is back in the housing, it is laid in the cover and the latter is closed and latched.

DETAILED DESCRIPTION OF AN ALTERNATIVE EMBODIMENT

An alternative embodiment is shown in FIG. 10, primarily to illustrate the application of the invention to an awning assembly 10 which does not use a spring-loaded roller for retracting the awning, but instead has a lead bar 14 upon which the awning 13 is manually rolled. This embodiment also illustrates a variation in the housing of the awning assembly, the housing 12 in this instance having a rear wall 64, bottom wall 65, front wall 66 and upwardly opening cover 61.

More specifically, the awning 13 in this embodiment has an inner edge portion 62 that is nipped into a groove 63 along the rear wall 64 of the housing, and is wrapped around the lead bar 14. As before, the main brace arms 15 and the stabilizer arms 17 are nested together and folded into the channel of the lead bar, and thus do not interfere with the rolling of the awning about the lead bar.

The lower portion of the housing 12 is an extrusion of basically U-shaped cross-section, with the shortened front wall 66 on which stabilizer anchors 18 are mounted. This extrusion provides an open-topped receptacle in which the rolled-up awning may be laid, as shown in FIG. 10. Suitable filler strips 67, 68, 69, 70 and 71 may be provided in the housing to prevent excessive movement of the stored awning in transit.

In this case, the hinge for the cover is formed along the upper side of the back wall 64 of the housing, by a beaded flange 72 on the cover 61 which extends through an upwardly opening slot 73, above a longitudinal channel 74 integral with the back wall. It should be emphasized, however, that the manually rolled up awning shown in this embodiment may be used with the downwardly opening housing of the other embodiment as well as with the upwardly opening housing shown. In all other significant respects, the components of the two embodiments may be the same, in construction and in operation, except that extension and retraction of the awning involve the manual unrolling and re-rolling of the awning.

From the foregoing, it will be evident that the present invention provides an improved retractable awning assembly which has not only the advantages of high stability and ease of manipulation of the patented awning assembly, but also the additional advantages achieved by mounting the stabilizer arms on the main braces, nesting these elements together, and then nesting them in the lead bar for storage. It also will be evident that, while two specific embodiments of the invention have been illustrated and described, various modifications and changes may be made without departing from the spirit and scope of the invention.

I claim as my invention:

1. A retractable awning assembly mountable on a supporting structure, and comprising:

an elongated housing mountable on the supporting structure;

an awning mounted in said housing for movement from a retracted position to an extended position, said awning having an inner edge secured within said housing and an outer edge portion movable out of said housing;

an elongated lead bar attached to said awning along said outer edge portion, said lead bar being an elongated channel of U-shaped cross-section;

at least one main brace for supporting said awning in the extended position, said main brace having an inner end for engagement with the supporting structure and an outer end pivotally connected to said lead bar for swinging of said main brace between a bracing position extending from said lead bar toward the supporting structure, and a storage position within said channel, said brace arm also being an elongated channel of U-shaped cross-section;

and a stabilizer arm having inner and outer ends, said stabilizer arm being pivotally connected at its outer end in the channel of said main brace adjacent the outer end thereof, and being swingable between a nested position in the channel of said main brace and a bracing position in which the inner end is spaced above the inner end of said main brace for engagement with the supporting structure.

2. The retractable awning as defined in claim 1 wherein said lead bar comprises an elongated channel of U-shaped cross-section, said outer ends of said main braces projecting into said channel and being pivotally connected thereto.

3. The retractable awning of claim 2 wherein said outer ends are pivotally connected to said channel to swing about axes that are offset from each other, transversely of the channel, to be received in the channel in parallel, side-by-side relation.

4. In a retractable awning assembly having an elongated housing mountable on a supporting structure such as a recreational vehicle, and an awning movable from a retracted position in said housing to an extended position in which an inner edge of the awning is attached within said housing and an outer edge is spaced outwardly therefrom, an improved bracing structure for holding the awning in said extended position, comprising:

an elongated lead bar attached to said awning along said outer edge;

means for holding said lead bar in spaced relation with said receptacle and including at least one brace for extending from said lead bar back toward the supporting structure, said brace having inner and outer ends;

means connecting said outer end to said lead bar when said awning is in said extended position and permitting folding of said brace into side-by-side relation with said lead bar;

and means forming an elongated recess in the side of said lead bar for receiving said brace in nested relation therein for retraction and storage of said awning.

5. A retractable awning assembly as defined in claim 4 in which said holding means comprise two of said main braces connected to said lead bar adjacent the opposite ends thereof, and said recess-forming means is an elongated channel extending the full length of said lead bar to receive both of said main braces.

6. A retractable awning assembly as defined in claim 5 in which said connection-forming means are pivots joining said braces to said lead bar and defining pivotal axes perpendicular thereto.

7. A retractable awning assembly as defined in claim 5 further including an elongated spring-loaded roller rotatably mounted within said housing, to return the awning from the extended position to the retracted position after said main braces have been folded into said channel.

8. A retractable awning assembly as defined in claim 4 in which said brace comprises:

a main brace arm extending from said lead bar back toward the supporting strucure and having a longitudinal recess therein along one side thereof; and a stabilizer arm pivotally connected to the outer end portion of said main brace arm in said longitudinal recess, and swingable relative to said main brace arm between a storage position nested in said longitudinal recess and a stabilizing position in which the inner end portion of said stabilizer arm extends upwardly out of said recess at an angle with the main brace arm.

9. A retractable awning assembly as defined in claim 8 in which said stabilizer arm comprises:

a tubular section pivotally connected at one end to said main brace arm and open at the other end;

an extension telescoped slidably in said tubular section and projecting through said open other end;

and means for releasably securing said extension to said tubular section in different extended positions relative thereto, thereby to adjust the length of said stabilizer arm.

10. A retractable awning assembly as defined in claim 4 in which said inner edge of said awning is stationarily attached to said housing, said lead bar being connected to said outer edge to serve as a roller for said awning after said brace has been folded into said elongated recess, and said receptacle having a space therein for receiving the awning rolled upon said lead bar with said brace therein.

11. In a retractable awning assembly having an elongated housing mountable on a supporting structure such as a recreational vehicle, an awning movable from a retracted position within said housing to an extended position in which an inner edge of the awning is attached within said housing and an outer edge is spaced outwardly therefrom, and an elongated lead bar connected to said awning along the outer edge thereof, an improved bracing structure for holding the awning in said extended position, comprising:

a main brace arm for extending from said lead bar back toward the supporting structure beneath said awning, and having an outer end connected to said lead bar and an inner end for engaging the supporting structure, said main brace arm having a longitudinal recess in its upper side;

and a stabilizer arm having an outer end pivotally connected to the outer end portion of said main brace arm in said recess, said stabilizer arm being swingable relative to said main brace arm between a storage position nested in said recess and a stabilizing position in which the inner end portion of said stabilizer arm extends out of said recess at an angle with said brace arm for engagement with the supporting structure above the inner end of said main brace arm.

12. A retractable awning assembly as defined in claim 11 in which said stabilizer arm comprises:

a tubular section pivotally connected at one end to said main brace arm and open at the other end;

an extension telescoped slidable in said tubular section and projecting through said open other end;

and means for releasably securing said extension to said tubular section in different extended positions relative thereto, thereby to adjust the length of said stabilizer arm.

13. A retractable awning assembly as defined in claim 11 in which said brace arm is pivotally connected to said lead bar to swing about a first axis perpendicular to said lead bar into a folded storage position in side-by-side relation with said lead bar, and said stabilizer arm is pivotally connected to said brace arm adjacent said lead bar to swing about a second axis substantially perpendicularly to said brace arm and to said first axis.

* * * * *